United States Patent Office 3,503,913
Patented Mar. 31, 1970

3,503,913
CARBAMATE LEVELING AGENTS IN
EMULSION FLOOR POLISH
Charles A. Lynch, Jr., Severna Park, and Henry G.
Wagner, Baltimore, Md., assignors to FMC Corporation, New York, N.Y., a corporation of Delaware
No Drawing. Filed Apr. 27, 1967, Ser. No. 634,109
Int. Cl. C09g 1/10
U.S. Cl. 260—28.5                                      3 Claims

ABSTRACT OF THE DISCLOSURE

This application discloses that carbamates of the formula:

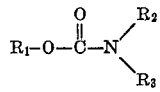

in which $R_1$ is an unsubstituted alkyl radical of 6 to 10 carbon atoms and mixtures thereof and $R_2$ and $R_3$ are independently selected from the group consisting of hydrogen, unsubstituted lower alkyl radicals containing 1 to 4 carbon atoms and monohydroxy substituted lower alkyl radicals containing 1–2 carbon atoms, perform the function of a leveling agent for emulsion floor polishes. The use of from ¼ to 2% of these carbamates as a leveling agent in emulsion floor polishes will cause polishes that would otherwise be splotchy, uneven or puddled to flow out to smooth, glossy, uniform films.

BACKGROUND OF THE INVENTION

Field of the invention

This invention relates to the use of selected carbamates as effective leveling agents in producing emulsion floor polish compositions.

Description of the prior art

Emulsion floor polishes are generally aqueous emulsions comprising a water insoluble film former which is either wax, or a waxy resin, with or without additional thermoplastic resin, together with a small amount of a resin which can be solubilized in water by the use of ammonia, and which acts as a binder for the emulsified resinous materials. These are invariably used in conjunction with a leveling additive which gives flexibility to the film and prevents crawling, pudding, crazing or cracking. The most universally used additive for this purpose is tris(2-butoxyethyl) phosphate. This material performs well since it confers excellent leveling and good water resistance to the dried polish film.

Most organic floor coverings (such as vinyl and asphalt tile, linoleum, etc.) are softened to some extent by the tris(2-butoxyethyl) phosphate in the emulsion floor polish. While this effect is not objectionable in most cases, and can be overcome by keeping the use of the material to a minimum, it would be desirable to have a leveling agent which is less active in this regard. Attempts to find such leveling agents heretofore have been unsuccessful because closely allied agents such as tris(2-ethoxyethyl) phosphate and other similar isomers and homologs of the tris(2-butoxyethyl) phosphate are not satisfactory leveling agents. A recent article by D. A. Lima and T. R. Hopper, Soap and Chemical Specialties, 42, 56 (1966) presents a detailed study of attempts to devise new leveling agents for floor polishes. Many organophosphorus esters were examined and none were observed to perform as well as tris(2-butoxyethyl) phosphate.

Certain perfluorocyclo compounds are commonly suggested leveling additives, but these compounds are expensive and always used in conjunction with tris(2-butoxyethyl) phosphate.

SUMMARY OF THE INVENTION

We have now discovered that carbamates of the formula:

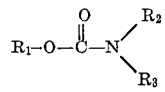

in which $R_1$ is an unsubstituted alkyl radical of 6 to 10 carbon atoms and mixtures thereof and $R_2$ and $R_3$ are independently selected from the group consisting of hydrogen, unsubstituted lower alkyl radicals containing 1 to 4 carbon atoms, and mono-hydroxy substituted lower alkyl radicals containing 1–2 carbon atoms perform the unique function of a leveling agent for emulsion floor polishes. The use of from ¼ to 2% of these carbamates as a leveling agent in emulsion floor polishes will cause polishes that would otherwise be splotchy, uneven, or puddled to flow out to smooth, glossy uniform films. Suitable carbamates which were evaluated and found to be useful in practicing this invention include: 2-ethylhexyl carbamate; mixed hexyl-decyl carbamates; mixed hexyl-decyl N-methylcarbamates; mixed hexyl-decyl N,N-di - methylcarbamates; mixed hexyl - decyl N - (2-hydroxyethyl)-N-methylcarbamates; isooctyl carbamates; isooctyl N-methylcarbamates; isooctyl N-(2-hydroxyethyl)-N-methylcarbamates; isooctyl N,N-bis-(2-hydroxyethyl)carbamates, mixed octyl-decyl carbamates; mixed octyl-decyl N-methylcarbamates; mixed octyl-decyl N,N-dimethylcarbamates; mixed octyl-decyl N-(2-hydroxyethyl)-N-methylcarbamates; mixed octyl-decyl N,N-bis(2-hydroxyethyl) carbamates; n-hexyl carbamate; mixed hexyl carbamates; mixed decyl carbamates; 2-ethylhexyl N-methylcarbamate and 2-ethylhexyl N,N-dimethylcarbamate. These compounds are of particular value as these carbamates have no softening or swelling action on vinyl or asphalt floor tile, linoleum and so forth, and therefore do not have a softening effect on these floor coverings.

The "isooctyl" carbamates are prepared from commercial "isooctyl" alcohols prepared by the "oxo" process (for example by the addition of carbon monoxide and hydrogen to mixtures of heptenes in the presence of a cobalt catalyst).

It is understood that the aforementioned carbamates are only representative of the class of compounds which may be used and that the use of these compounds, according to this invention, is not necessarily limited thereto.

The carbamates which are preferred for use as leveling agents are: 2-ethylhexyl carbamate, 2-ethylhexyl N-methylcarbamate, 2-ethylhexyl N,N-dimethylcarbamate, mixed hexyl-decyl carbamates, isooctyl carbamates, isooctyl N-methylcarbamates, mixed octyl-decyl carbamates, mixed octyl-decyl N-methylcarbamates, mixed decyl carbamates and n-hexyl carbamate.

Isopropyl carbamate, n-butyl carbamate, allyl carbamate, phenyl carbamate, 2-(butoxyethyl) carbamate and N-substituted 2-(butoxyethyl) carbamates, lauryl carbamate, mixed cetyl stearyl carbamates, ethyl N-dodecyl-carbamate, mixed lauryl myristyl N,N-dimethylcarbamates, ethyl N-octylcarbamate and ethyl N,N-dioctylcarbamate were all evaluated and found to be poor or ineffective as leveling agents in the typical emulsion floor polish formulations outlined in the examples.

DESCRIPTION OF THE PREFERRED EMBODIMENTS

The carbamates of this invention can be made by heating the appropriate alcohol with urea to produce the carbamate; and by reacting 1 mole of the appropriate alcohol with 1 mole of phosgene to yield 1 mole of chloroformate, and the chloroformate is treated with ammonia ($NH_3$) in some form, or with an amine, to form the appropriate carbamate. The methods of producing the carbamates are described in the technical literature: for the urea-alcohol process see Chemical Reviews, vol. 65, pp. 567 et seq. Esters of Carbamic Acid by Phillip Adams and Frank A. Baron and for the ammonolysis of an appropriate chloroformate, see Encyclopedia of Chemical Technology, edited by R. E. Kirk and D. F. Othmer, first edition, vol. 14, pp. 473 et seq.

The carbamates of this invention are used in floor polishes in rather low concentrations, on the order of about ¼ to 2%, depending on the solids content of the polish. The solids content of the emulsion floor polish is generally on the order of 10 to 16%, and optimum results are apparently obtained at about 15% solids and about 0.5 to 1.5% of the leveling agent, based on the total polish weight.

The water-insoluble film former in these emulsion floor polishes may be a wax, or a wax substitute, such as carnauba, montan, paraffin, polyethylene or Fischer-Tropsch waxes, and the like. These are blended with major quantities of emulsified thermoplastic resins, such as polystyrene, polyacrylate, and polyacrylate-acrylonitrile resins chosen for both their good properties and their low cost. The polystyrene resins are often sold blended with a small amount of shellac. These waxes and resins generally comprise about 75 to 90% of the total solids of the emulsion. Mixed with these materials are ammonia solutions of other thermoplastic resins, such as partially esterified modified rosin, and styrene/maleic copolymers, and other thermoplastics which are ammonia-soluble. These ammonia solutions act to unify the film and level it somewhat, while at the same time the resins become water-insoluble along with the rest of the material on evaporation of the ammonia. The balance of the floor polish composition, usually less than about 5% of the total polish composition, generally is made up of small amounts of solvents, plasticizers, masking agents, fungicides, leveling agents, coalescing and slip-proofing agents.

The raw materials and formulations for emulsion floor polishes are quite well known in the trade, being extensively described in the technical data bulletins of the various suppliers of the various ingredients for use in emulsion floor polishes.

The following typical examples of the preparation of the carbamates and their use in emulsion floor polishes are given by way of example and not by way of limitation. All parts and percentages are by weight. The trademarked materials used in the examples are identified as to source in the footnotes following Example 23.

EXAMPLE 1

| | Parts by weight |
|---|---|
| Shellac modified styrene emulsion * (Synthemul 40–203 TM (1)) | 70 |
| Ammonia soluble resin * (Shanco 1165–S TM) (2) | 15 |
| Polyethylene emulsion * (Poly Em 20 TM) (3) | 15 |
| Carbitol (Carbitol TM) (4) | 1.5 |
| 2-ethylhexyl carbamate | 1.0 |

* All at 15% non-volatile in water.
(1), (2), (3), (4)—See notes at end of tables, Column 6.

A film of the above polish was spread on vinyl and asphalt tile at a rate of about 1 gallon per 1,000 square feet. Gloss, leveling, and water resistance were all rated excellent. The shellac modified styrene polymer emulsion of this example is purchased at 50% solids as Synthemul 40–203, and reduced to 15% solids. The ammonia soluble resin used in this example had a melting point of 148 to 158° C. and an acid number of 180 to 190. The polyethylene emulsion used was a pH stable anionic polyethylene emulsion.

EXAMPLE 2

Example 1 was repeated except the leveling agent of Example 1, 2-ethylhexyl carbamate, was replaced with 0.5 part by weight of mixed hexyl-decyl carbamates. A film of this polish was spread on vinyl and asphalt tile at the rate of about 1 gallon per 1,000 square feet. Gloss and leveling were rated very good. The early water-spot resistance was initially rather poor, but after 24 hours the water-spot resistance was entirely satisfactory.

EXAMPLE 3

Example 1 was repeated except that the leveling agent of Example 1, 2-ethylhexyl carbamate, was replaced with 0.5 part by weight of 2-ethylhexyl N-methylcarbamate. A film of this polish was spread on vinyl and asphalt tile at the rate of about 1 gallon per 1,000 square feet. Gloss and leveling of this example was not perfect, but the 2-ethylhexyl N-methylcarbamate did show a definite leveling effect.

EXAMPLE 4

Example 1 was repeated except that the leveling agent 2-ethylhexyl carbamate was replaced with 0.5 part by weight of mixed octyl-decyl carbamates. Films of this polish were spread on vinyl and asphalt tile at the rate of about 1 gallon per 1,000 square feet. The gloss and leveling were rated very good. The octyl-decyl carbamates have a high melting point and are best incorporated into the polish composition by dissolving in Carbitol and thereby adding as a solution.

EXAMPLE 5

Example 1 was repeated except that the leveling agent of Example 1, 2-ethylhexyl carbamate, was replaced by 0.5 part by weight of mixed octyl-decyl N-methylcarbamates. Films of this polish were spread on vinyl and asphalt tiles at the rate of 1 gallon per 1,000 square feet. The gloss and leveling were considered excellent and the water spot resistance was considered to be good.

EXAMPLE 6

Example 5 was repeated except that the leveling agent, mixed octyl-decyl N-methylcarbamates, was replaced by 0.5 part by weight of mixed octyl-decyl N,N-dimethylcarbamates. The N,N-dimethylcarbamates did show leveling effect; however, they were significantly poorer than the N-methyl substituted product of Example 5 as a leveling agent.

EXAMPLE 7

Example 1 was repeated except that the leveling agent, 2-ethylhexyl carbamate, was replaced by 0.5 part by weight of mixed decyl carbamates. A film of this polish was spread on vinyl and asphalt tile at a rate of about 1 gallon per 1,000 square feet. The gloss and leveling were very good and the water spot resistance was rated as good. Although this leveling agent imparts good leveling and water resistant properties, the mixed decyl carbamates are slow in developing full effectiveness in the polish and best results are obtained after storing the compounded polish for a period of two weeks.

EXAMPLE 8

Example 1 was repeated except that the leveling agent of Example 1, 2-ethylhexyl carbamate, was replaced by 0.5 part by weight of n-hexyl carbamate. The gloss and leveling of this example were rated good and the water spot resistance rated as poor.

EXAMPLE 9

| | Parts by weight |
|---|---|
| Acrylic-styrene copolymer emulsion* (Neocryl A-247-H) (5) | 70 |
| Ammonia soluble resin* (Shanco 1165-S) (2) | 15 |
| Polyethylene emulsion* (Poly Em 20) (3) | 15 |
| Carbitol (4) | 1.5 |
| 2-ethylhexyl carbamate | 0.5 |

*All at 15% non-volatile in water.
(5), (2), (3), (4)—See notes at end of tables, Column 6.

A film of the above polish was spread on vinyl and asphalt tile at the rate of about 1 gallon per 1,000 square feet. Gloss and leveling were considered good, and water resistance was found to be fair.

The ammonia soluble resin and polyethylene emulsion are the same as were used in Example 1. The acrylic-styrene copolymer emulsion used was Neocryl A-247-H (TM).

EXAMPLE 10

Example 9 was repeated except that the leveling agent of Example 9, 2-ethylhexyl carbamate, was replaced by 0.5 part by weight of isooctyl carbamates. Films of this sample were spread on vinyl and asphalt tile at the rate of about 1 gallon per 1,000 square feet. Leveling, gloss and water resistance were all rated excellent. The water spot resistance was found to be very good after the film had dried for only 1 hour.

EXAMPLE 11

Example 9 was repeated except that the leveling agent, 2-ethylhexyl carbamate, was replaced by 0.5 part by weight isooctyl N-methylcarbamates. Films of this sample were spread on vinyl and asphalt tile at the rate of 1 gallon per 1,000 square feet. Gloss, leveling and water resistance, after 24 hours aging, were very good. The leveling of this polish was only very slightly inferior to the unsubstituted isooctyl carbamates of Example 10.

The following examples, numbered 12 to 23, further illustrate this invention using additional carbamates as leveling agents in floor polish compositions. Comparative Examples A, B, C, and D containing tris(2-butoxyethyl) phosphate as the leveling agent were also prepared and evaluated.

| Ingredients | Emulsion Floor Polish Examples | |
|---|---|---|
| | 22 | 23 |
| Zinc cross-linked modified acrylic copolymer emulsion* (Rhoplex B-336)(6) | 70 | 70 |
| Thermoplastic polyester-type resin, M.P. 157° C., Acid No. 200* (Durex 19788 (8) | 20 | 20 |
| Wax emulsion at 16.5% non-volatile ** | 10 | 10 |
| Carbitol | 1.5 | 1.5 |
| Isooctyl carbamates | 0.5 | |
| 2-ethylhexyl carbamate | | 0.5 |
| Leveling (paper) | 1 | 1 |
| Water spot resistance: | | |
| 15′ | 5 | 5 |
| 30′ | 5 | 5 |
| 45′ | 5 | 5 |
| 60′ | 5 | 5 |
| Gloss, Gardner 60° Glossmeter | 62 | 66 |

| | Parts by Weight |
|---|---|
| Ester wax (Hoescht KSL) (10) | 4.4 |
| Polyethylene. low MW, emulsifiable (AC-629 (9) | 3.3 |
| Emulsifiable polyethylene, MW, about 2500 (Epolene E-10)(11) | 3.3 |
| Microcrystalline wax, hard, non-oxidized, high melting (C-700)(11) | 5.5 |
| Oleic acid | 1.4 |
| Potassium hydroxide (43%) | 0.5 |
| Morpholine | 1.8 |
| Water | 79.8 |
| | 100.0 |

* At 15% non-volatile in water.
** Wax emulsion.

NOTES
(1) Reichhold Chemicals, Inc.
(2) Shanco Plastics and Chemicals, Inc.
(3) Gulf Oil Corporation.
(4) Union Carbide Corporation, Chemicals Division.
(5) Polyvinyl Chemicals, Inc.
(6) Rohm and Haas Company.
(7) UBS Chemical Division.
(8) Hooker Chemical Comapny, Durez Plastics Division.
(9) Allied Chemical Corporation. Plastics Division.
(10) American Hoescht Corporation, Hostachem Division.
(11) Petrolite Corporation, Bareco Division.

These examples are of the general types of formulations which are used throughout the emulsion floor polish industry. Additional polymer emulsions such as pure acrylic polymer emulsions and metal-containing acrylic polymer emulsions as well as a variety of ammonia-soluble resins and waxes were substituted for the corresponding materials in the above examples. These changes in materials were not found to materially alter final performance of the floor finishes. The resins, waxes, ammonia-soluble resins, masking agents, fungicides, leveling agents, coalescing and slip-proofing agents and the general formulations for producing emulsion floor

| Ingredients | Emulsion Floor Polish Examples | | | | | | | | | | Comparative Examples | | | |
|---|---|---|---|---|---|---|---|---|---|---|---|---|---|---|
| | 12 | 13 | 14 | 15 | 16 | 17 | 18 | 19 | 20 | 21 | A | B | C | D |
| Shellac-modified styrene emulsion* (Synthemul 40-303)(1) | 70 | 70 | 70 | | | | | | | 70 | 70 | | | |
| Acrylic emulsion* (Rhoplex B-217)(6) | | | | 70 | 70 | 70 | | | | | | 70 | | |
| Acrylic interpolymer emulsion* (Ubatol U3400) (7) | | | | | | | 70 | 70 | | | | | 70 | |
| Acrylic-styrene copolymer emulsion* (Neocryl A-247-H)(5) | | | | | | | | | 70 | | | | | 70 |
| Ammonia-soluble thermoplastic polyester type resin* (Durez 19788)(8) | 15 | 15 | 15 | 15 | 15 | 15 | 15 | 15 | 15 | 15 | 15 | 15 | 15 | 15 |
| Emulsifiable polyethylene, low molecular weight, M.P.212-231° F.* (AC-629)(9) | 15 | 15 | 15 | 15 | 15 | 15 | 15 | 15 | 15 | 15 | 15 | 15 | 15 | 15 |
| Carbitol (4) | 1.5 | 1.5 | 1.5 | 1.5 | 1.5 | 1.5 | 1.5 | 1.5 | 1.5 | 1.5 | 1.5 | 1.5 | 1.5 | 1.5 |
| Mixed hexyl-decyl N-methyl carbamates | 0.5 | | | | | | | | | | | | | |
| Mixed hexyl-decyl N,N-dimethyl carbamates | | 0.5 | | | | | | | | | | | | |
| 2-ethylhexyl N,N-dimethyl carbamate | | | 0.5 | | | | 0.5 | | | | | | | |
| Mixed hexyl-decyl N-methyl-N-(2-hydroxyethyl)carbamates | | | | 0.5 | | | | | | | | | | |
| Mixed octyl-decyl N,N-bis-(2-hydroxyethyl)carbamates | | | | | 0.5 | | | 0.5 | | | | | | |
| Hexyl carbamate | | | | | | 0.5 | | | | | | | | |
| Isooctyl N,N-bis-(2-hydroxyethyl)carbamate | | | | | | | | | 0.5 | | | | | |
| Isooctyl N-methyl-N-(2-hydroxyethyl)carbamate | | | | | | | | | | 0.5 | | | | |
| Tris(2-butoxyethyl) phosphate | | | | | | | | | | | 0.5 | 0.5 | 0.5 | 0.5 |
| Properties: | | | | | | | | | | | | | | |
| Leveling** | 3 | 2 | 2 | 2 | 2 | 1.5 | 5 | 2 | 1 | 1 | 2 | 2 | 2 | 2 |
| Water spot, 60 min.** | 2 | 2 | 2 | 4 | 2 | 4 | 5 | 5 | 5 | 5 | 5 | 5 | 5 | 5 |
| Gloss, 60° | 74 | 75 | 70 | 45 | 60 | 65 | | 55 | 68 | 65 | 57 | 57 | 57 | 57 |

* All at 15% non-volatile in water.
** Ratings:
    1—excellent, completely satisfactory.
    2—very good, satisfactory.
    3—good, barely satisfactory.
    4—poor, unacceptable.
    5—Complete failure.
(1), (6), (7), (5,) (8), (9), (4)—See note at end of tables, Column 6.

polishes are quite well known in the trade, being extensively described in the technical data bulletins of the suppliers of the various products used in emulsion polymer floor polishes.

Obviously these examples can be multiplied endlessly without departing from the scope of the invention which is defined in the following claims.

What is claimed is:

1. An emulsion floor polish composition comprising a major portion of a water-insoluble polymer, including a waxy material, a small proportion of an ammonia-soluble resin, and from ¼ to 2% leveling agent, based on the total weight of the polish composition, in which the improvement comprises using as a leveling agent a carbamate of the formula:

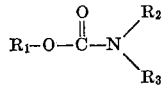

in which $R_1$ is an unsubstituted alkyl radical of 6-10 carbon atoms and mixtures thereof and $R_2$ and $R_3$ are independently selected from the group consisting of hydrogen, unsubstituted lower alkyl radicals containing 1-4 carbon atoms and monohydroxy substituted lower alkyl radicals containing 1-2 carbon atoms.

2. The emulsion floor polish composition of claim 1 in which the carbamate leveling agent is selected from the group consisting of 2-ethylhexyl carbamate, 2-ethylhexyl N-methylcarbamate, 2-ethylhexyl N,N-dimethylcarbamate, mixed hexyl-decyl carbamates, isooctyl carbamates, isooctyl N-methylcarbamates, mixed octyl-decyl carbamates, mixed octyl-decyl N-methylcarbamates, mixed decyl carbamates and n-hexyl carbamate.

3. The emulsion floor polish composition of claim 1 in which the carbamate leveling agent is isooctyl carbamates.

References Cited

D. A. Lima and T. R. Hopper, "Leveling of Emulsion Floor Polishes," Soap and Chemical Specialities, 42, 56, 1966.

MORRIS LIEBMAN, Primary Examiner

P. R. MICHL, Assistant Examiner

U.S. Cl. X.R.

260—27, 29.6